United States Patent Office 3,234,784
Patented Feb. 15, 1966

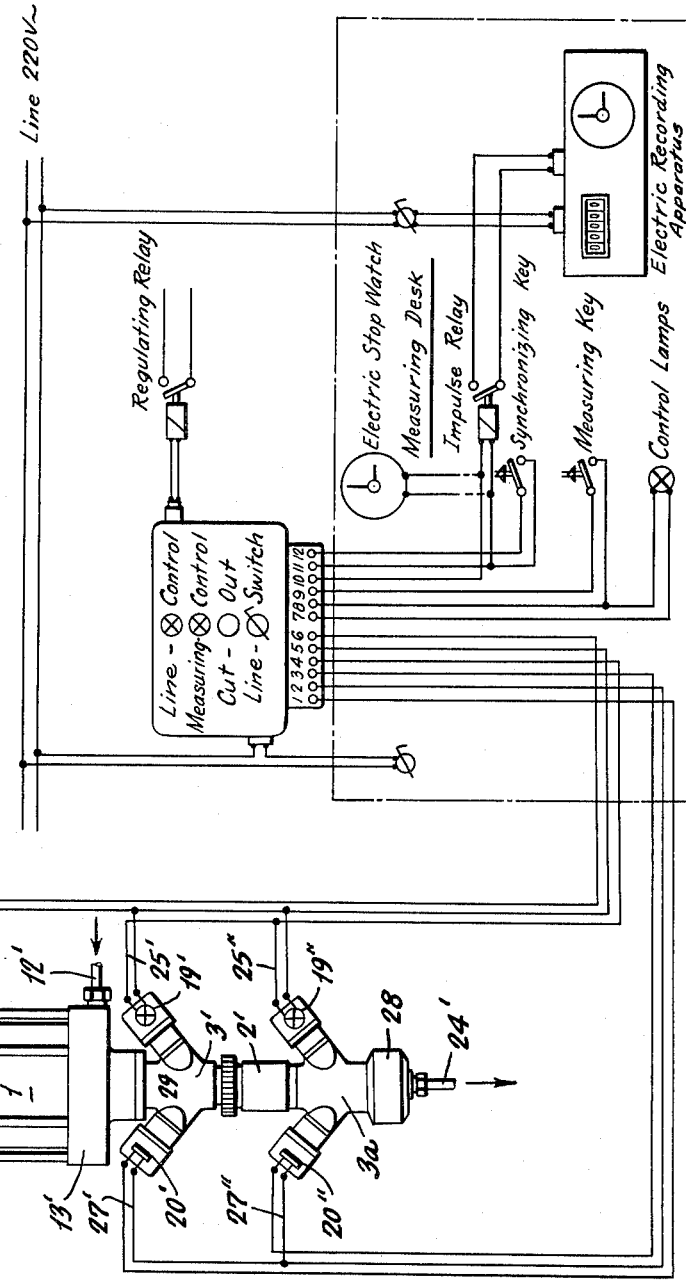

3,234,784
AUTOMATIC LIQUID METER
Walter Wiegmann, Gutersloh, Westphalia, Germany, assignor to Seppeler-Stiftung Fur Flug und Fahr-Wesen, Neuenkirchen uber Gutersloh, Westphalia, Germany
Filed Apr. 30, 1962, Ser. No. 191,106
Claims priority, application Germany, May 2, 1961, S 73,790/61; Apr. 4, 1962, S 78,827/62
6 Claims. (Cl. 73—113)

The present invention relates to an automatic liquid meter, particularly for measuring the fuel consumption of internal combustion engines, heating systems and the like.

Liquid meters are already known in which the flow of a fuel through a calibrated measuring glass is measured by means of a stop watch. Such devices have major drawbacks. Since the precision of measurement depends upon the personal equation of the person making the measurement, the results thus obtained are hardly equivalent to an objective measurement of fuel consumption. Moreover, observation of the fuel level inside the measuring glass is usually impeded by deposits such as oily residues which obscure the glass. For cleaning the glass, the engine on the test bed must be stopped because the supply of fuel is disconnected.

It has also been found that noise, especially in a hall containing a battery of test beds, greatly impairs the precision of such a consumption test. The location of the meters in a sound-proof room is usually impossible because the fuel supply pipes are then excessively long. Even if such an arrangement is practicable, the first mentioned drawbacks are not overcome. Experience shows that even highly skilled personnel fail to obtain consistent results.

The present invention provides a fully automatic liquid meter which is based upon an entirely new principle of control for measuring, for instance, the fuel consumption of engines, heating systems and the like. This consists in performing a volumetric measurement entirely under the control of an electrical system incorporating key operable magnetic valve means and one or more photocells.

The proposed automatic liquid meter comprises three major cooperating components, namely a measuring instrument proper, an amplifying unit and a stop watch with an operating key. The arrangement permits the proposed measurement to be performed in various ways, for instance in such manner that by the incorporation of a multiway selector switch the measurement of fuel consumption of several engines can be read and controlled from a central control point. To this end each engine test bed is provided with a measuring instrument built into the associated fuel supply line, whereas the amplifier, the stop watch and the operating key are all located at a central control point.

The central control of fuel consumption tests may be further simplified and rationalized by automatically recording the measured data on a paper tape upon which at the same time, the brake horsepower, the speed of revolution and the temperatures of exhaust and coolant may be recorded by graphs. The complete independence of location of the measuring instrument and the indicating or recording devices, which is the prerequisite of a central control also has major advantages in other applications, for instance in fuel tests performed on marine engines, oil burning furnaces, and power stations. Control of the measurement may be by hand or by means of an automatic switching device which works according to a preset program, for instance for checking the fuel consumption of engines in the course of long test runs.

The measuring instrument according to the invention, which is illustratively shown in the accompanying drawings, is built into the fuel supply line between fuel tank and the engine, oil burner and the like which is under test. The instrument comprises a compensating chamber for the fuel, a measuring cylinder and at least one photo-head containing a photo-cell and associated means for illuminating the cell.

A magnet system built into the cover of the compensating chamber permits the entry of fuel into the measuring cylinder to be arrested and a stop watch simultaneously started by a relay, the stop watch being automatically stopped when the fuel level in the measuring cylinder has fallen to a point where it can reflect a beam of light produced in the photo-head into the window of the photocell. Naturally, the apparatus requires the provision of amplifying means for amplifying the very weak currents generated by the photocell in such manner that the amplified current can be used for controlling the required switching operations.

The amplifying unit is not shown in the accompanying drawings because it is of a kind well known to the art based on the use of valves or transistors. The working current will usually be derived from the mains and applied to the relay after transformation and rectification. However, the necessary power may be supplied by a battery.

The third main component, namely the stop watch with an operating key is started and stopped by an instantaneous electrical pulse, zeroization being effected in conventional manner by the manual depression of a zeroizing key. The depression of the operating key initiates the measuring process.

Generally, the precision obtained by using one photo-head is quite sufficient. The level of fuel in the compensating chamber must first be adjusted to a predetermined level and no major fluctuations of pressure should occur in the fuel supply. If it is desired to achieve an extremely high degree of precision despite difficult and fluctuating conditions of pressure in the fuel supply lines, or when performing high precision physical measurements, a liquid meter comprising a single photo-cell may not be sufficiently accurate. Variations in level of the fuel inside the compensating chamber also affect the fuel level in the hollow valve stem through which the air pressures in the compensating chamber and in the measuring cylinder are kept in balance. This may lead to minor inaccuracies in the results. Moreover, instruments comprising only one photo-head do not permit intermediate volumetric measurements to be made.

In order to satisfy these requirements, an automatic liquid meter according to the invention may be provided with two or more photo-heads which consecutively indicate the levels of the fuel in a measuring cylinder. In such an instrument, the only purpose of the magnetic valve is to interrupt the flow of fuel through the instrument during the process of measurement. Whereas depression of the key causes the magnetic valve to close, the upper photo-cell actually initiates the measurement and starts the stop watch by reflecting the light into the photocell when the fuel level reaches the relative light spot, and the lower photocell is responsible for terminating the measurement when the fuel level reaches the lower light spot, stopping the stop watch and reopening the magnetic valve for the readmission of fuel into the measuring cylinder and the continuation of fuel supply through the instrument without interruption. The measurement is then based upon the calibrated capacity of the measuring cylinder defined by the position of the two light spots. The time taken for the fuel level to fall from the upper to the lower light spot can be measured either by a stop watch or recorded by an electric recording instrument. If desired, the results of the measurement can be directly fed into a data processing or evaluating machine.

Embodiments of the automatic liquid meter according to the invention will now be described in greater detail by reference to the accompanying drawings in which:

FIGURE 3 is a view showing diagrammatically a wiring arrangement for the meter illustrated in FIGURE 2.

Figure 1:
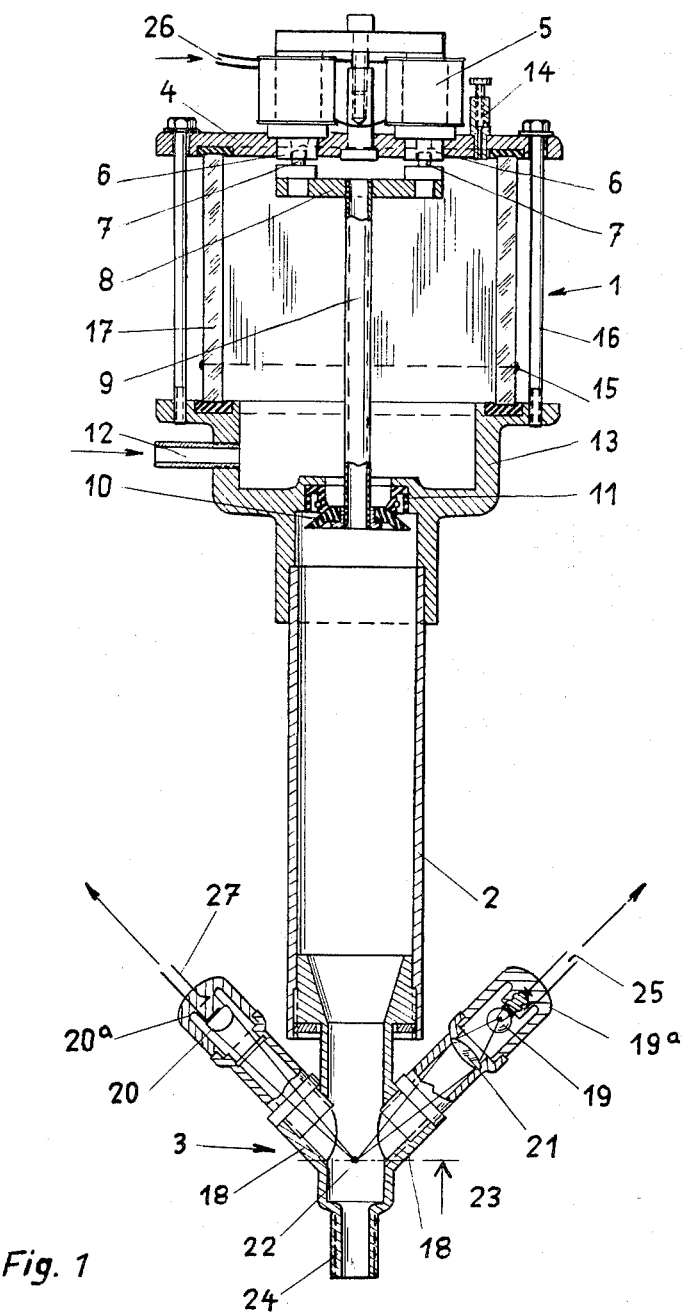
FIG. 1 is an axial section of a liquid meter fitted with a photo-head.

The liquid meter in FIG. 1 which comprises a compensating chamber 1, a measuring cylinder 2 and a photo-head 3 may be mounted on a common panel together with an amplifier and a stop watch and key, or it may be separately located as has been described. In either case, the several components are connected by electrical conductors.

Built into cover 4 of the compensating chamber is a magnet system 5. Poles 6 of the magnet project into the interior of the chamber and are sealed in the cover 4. Pins 7 projecting from armature 8 are guided in the poles 6 and maintain a mushroom valve head 10 which is attached to the armature by a hollow stem 9, in central alignment with its seating 11 in the compensating chamber floor. An admission pipe 12 for the liquid enters floor portion 13 of the compensating chamber 1. The cover 4 is fitted with an air venting valve 14 which permits the level of the fuel to be adjusted as required in the bottom part of the chamber, for instance in register with a mark 15. The hollow valve stem 9 provides an intercommunicating passage for equalizing the air pressures in the compensating chamber 1 and in the measuring cylinder 2. Tension bolts 16 secure a glass cylinder 17 in a fluid-tight manner between the cover 4 and the floor portion 13 of the compensating chamber 1. When the magnet system 5 is energized, the armature 8, guided by its pins 7, is pulled upwards into contact with the poles 6 and thereby raises the valve head 10 by its stem 9 tightly on to its seating 11. The capacity of the measuring cylinder 2 between compensating chamber 1 and photo-head 3 is designed to contain a given volume. The photo-head 3 which is tightly screwed into the bottom of the measuring cylinder 2 has two diametrically opposed tubular arms 18 placed in the form of a V. One arm 18 is adapted for the reception in a socket 19a of a lamp 19, whereas the other arm has a socket 20a for the reception of a photocell 20. The lamp 19 illuminates a collecting lens 21 which projects a convergent beam focused at 22 in the prolonged axis of the measuring cylinder. When the falling fuel level 23 reaches the light spot at 22 during a measurement, the convergent beam of light is reflected by the fuel surface into the photocell 20.

Fuel outlet 24 which is connected with the engine fuel pipe is at the bottom end of the photo-head 3.

Electrical connections 25 of lamp 19 and connections 26 of the magnet system 5 both lead to the operating key through an interposed amplifying means, the key being simultaneously connected with a stop watch. Electrical connections 27 of the photocell lead via the amplifier to the automatic switching device which controls the supply of current to the connections 25 and 26.

This automatic liquid meter which is fitted with one photo-head, as shown in FIG. 1, operates as follows:

The fuel for the tested engine flows unimpeded through the fuel pipe from the fuel tank through the automatic liquid meter to the engine. The fuel level in the compensating chamber is set to mark 15 by adjustment of the air venting valve 14. For effecting a measurement, the liquid meter is activated by the depression of the operating key. A pair of contacts is thus closed for energizing a relay associated with the amplifier which transmits a current pulse through electrical connections to the stop watch which is thus started. The stop watch is now allowed to run until the measurement is terminated. Simultaneously, the electric circuits of lamp 19 in photo-head 3 and of the magnet system 5 are closed, whereas the electrical supply leads 27 of the photocell 20 are connected to the amplifier. The flow of fuel is interrupted by the closure of valve 10 due to the energization of the poles, pins and armature 6, 7 and 8, respectively, and the fuel in the measuring cylinder which ceases to be replenished from above therefore slowly flows out through the fuel outlet to the engine. The venting air required to permit the fuel level in the cylinder to fall can enter through the hollow valve stem 9 from the upper part of the compensating chamber 1. The air volume which is thus withdrawn from the compensating chamber is replaced in the compensating chamber by a like volume of fuel entering at 12. Since the capacity of the compensating chamber 1 exceeds that of the measuring cylinder 2, the rising fuel in the compensating chamber cannot rise sufficiently to cover the open upper end of the hollow valve stem and thereby to interrupt the flow of compensating air. The falling fuel level in the measuring cylinder eventually reaches the light spot 22 at the focus of the convergent beam. As the fuel level 23 passes through this point 22 where the axes of the arms of photocell and lamp intersect, the beam will be reflected into the window of photocell 20 which instantaneously responds by sending a weak current through the electrical connections 27 to the amplifier. This current pulse is amplified by the amplifier sufficiently to perform a switching action and to deenergize the relay. The relay releases and thus cuts off the current from the poles, pins and armature 6, 7 and 8, respectively, as well as from lamp 19, and at the same time a current pulse to the stop watch stops the watch. The supply of current to the photocell 20 is also interrupted. The deenergized poles and pins 6 and 7, respectively, release the armature 8 and thus cause the valve 10 to open, which now permits the accumulated fuel in the compensating chamber 1 to drain into the measuring cylinder 2 and to refill the same. The air displaced from the measuring cylinder 2 is forced through the hollow valve stem 9 back into the compensating chamber 1 and the automatic liquid meter is ready for another measurement.

The described liquid meter therefore permits the supply of fuel to the engine to continue without interruption. The time required by the fuel from the instant of closure of the valve to fall in the measuring cylinder to the level of the point of intersection of the axes of the hollow lamp and photocell arms 18 of photo-head 2 can be read at the stop watch. By reference to a calibration chart, this reading can be immediately translated into the fuel consumption of the tested engine per hour or minute. If desired, the dial of the stop watch may be directly provided with a calibrated scale giving the fuel consumption in convenient terms. The hand of the stop watch is zeroized by operation of the zeroizing key.

Figure 2:
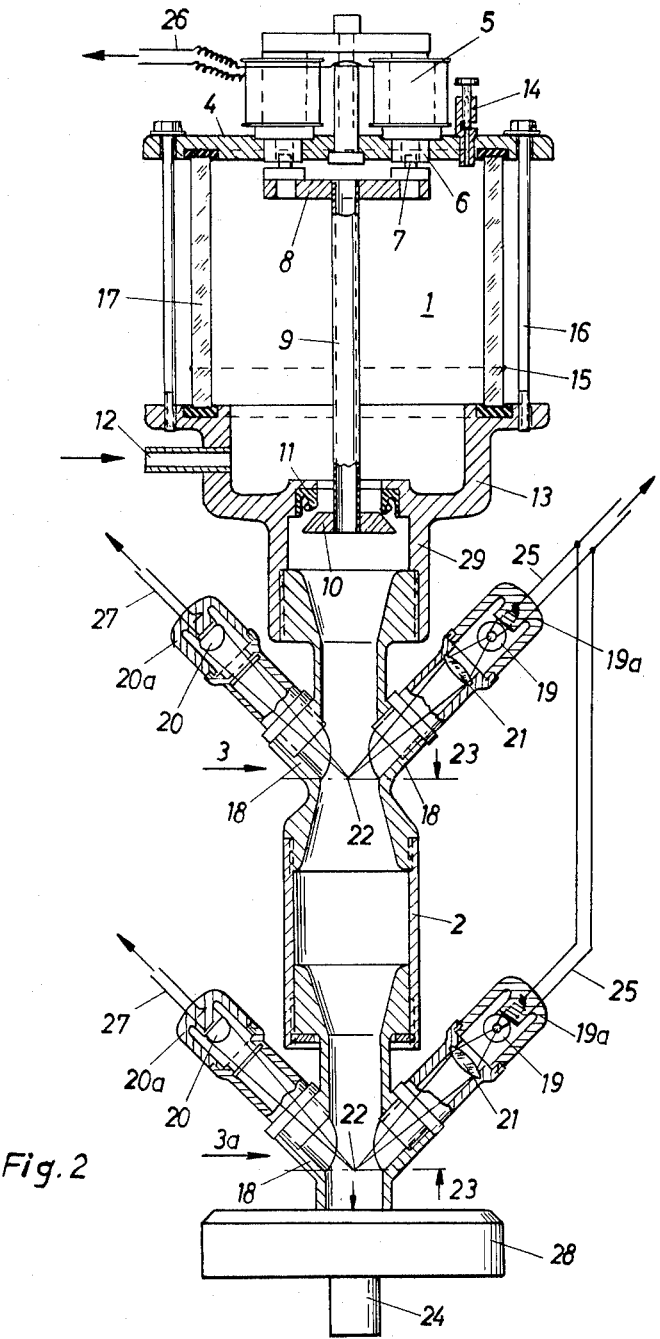
FIG. 2 is an axial section of a similar liquid meter equipped with an upper photo-head and a lower photo-head with a run-out chamber being shown in elevation.

In the embodiment of the liquid meter shown in FIG. 2, comprising two photo-heads, the upper photo-head 3' is tightly screwed into outlet socket 29 of compensating chamber 1'. Lower photo-head 3a is attached to the bottom of the measuring cylinder 2' which is threadedly attached to the upper photo-head. Below the lower photo-head is a run-out chamber 28 which has outlet 24' connected to a fuel supply pipe not shown in the drawing.

The electrical connections 25' and 25" of the two lamps 19' and 19" in the two photo-heads 3' and 3a and the electrical connection 26' of the magnet system 5' lead through an amplifier to the operating key. The two photocells 20' and 20" are connected with the amplifier by electrical connections 27' and 27".

This liquid meter with two photo-heads operates as follows:

(1) The depression of the operating key causes current to flow from the amplifier through connections 25', 25" and 26'. The magnet system thus energized will therefore close valve 10' for the duration of the measurement, whereas the lamps 19' and 19" in each photo-head 3' and 3a start to glow. The further flow of fuel through the meter is interrupted by the closure of valve 10'. The fuel level below the valve will therefore fall at a rate determined by the fuel consumption of the engine. Balance of air pressures between the compensating chamber 1' and the measuring cylinder 2' is maintained through the hollow valve stem 9'.

(2) The falling fuel level will first pass through the measuring point of the upper photo-head 3'. The light reflected into photocell 20' causes the stop watch to be started via the amplifier.

(3) As the fuel level continues to fall in the measuring cylinder 2' it will finally reach the light spot in the lower photo-head 3a. The reflection of the light into photocell 20' now stops the stop watch via the amplifier and re-opens valve 10'. The measuring cylinder is rapidly refilled with the fuel which has meanwhile accumulated in the compensating chamber 1'. From the time shown on the stop watch, which is the time taken by the fuel to empty the calibrated capacity of the measuring cylinder between the two measuring points of the photo-heads, the exact fuel consumption per hour of the tested engine can be calculated or directly obtained from a table or chart.

The automatic liquid meter according to the invention has many possible applications. By the incorporation of a multiway switch, the fuel consumptions of several engines can be tested from a central control point. To this end, a meter may be provided in the fuel admission line serving each test bed. The amplifier, stop watch with the operating key, as well as the multiway selector switch, may be located on a central control panel.

Moreover, the measured values may be recorded by a pen recorder on paper tape upon which the brake horsepower, speed of rotation and temperatures of exhaust, cooling water and the like, can be simultaneously graphically recorded.

Another application is the control of the fuel consumption of marine engines and oil burning furnaces, power stations and the like. The facility of locating the metering instrument and the indicating or recording means at different points is of considerable utility. Measurements can be performed by controlling the instrument by hand, as has been described, or automatic programmed devices may be employed, for instance for checking engines during prolonged testing.

The advantage of the proposed automatic liquid meter is that a mains power failure will not have the effect of stopping the test run of the engine, because the fuel continues to run through the open valve of the meter. The precision of measurement does not depend upon the human equation which is known to differ between individuals very considerably. If the sockets for the photocell and the lamp are approximately mounted, the fuel need not come into contact with the photocell window or with the collecting lens of the lamp (caisson effect). The unavoidable residues, especially of heavy oils, which would quickly cover glass surfaces cannot therefore affect the optical systems in the described automatic fuel meter. Consequently precision measurements can still be made after prolonged periods of use. The employment of low voltages and low currents makes the automatic fuel meter completely safe even for measuring the consumption of light and inflammable fuels.

For determining the fuel consumption of engines, heating systems and the like, a liquid meter according to the invention comprising two or possibly even more photo-heads, assures a measurement of the utmost precision, unaffected by external factors, such as changes in pressure in the fuel pipe. The measurement is completed in the shortest possible time and facilities can be provided for measuring different intermediate volumes in the same instrument.

The safety and precision of the meter is further increased by the fact that a measurement once initiated cannot be interrupted or affected, even if the control key is accidentally depressed several times.

The provision of a run-out chamber at the outlet end of the instrument further improves the efficiency of the meter because this chamber, on the one hand, prevents air from entering the fuel pipe at the end of a measurement when the measuring cylinder is being refilled and, on the other, because the run-out chamber functions as an accumulator which ensures a continuous and uninterrupted supply of fuel to a tested engine even if a major number of measurements is carried out in quick succession.

What I claim is:

1. An assemblage for automatically determining the fuel consumption of internal combustion engines, heating plants and the like, comprising a compensating chamber for the fuel to be measured and having a volume of air therein, said chamber having an outlet, magnetically controlled valve means for opening and closing said outlet, a measuring cylinder below and in communication with said outlet, an outlet conduit for said measuring cylinder, said compensating chamber and measuring cylinder being located in a fuel line between a fuel source and point of utilization, said valve means including a hollow stem providing communication between the upper portion of the compensating chamber and the measuring cylinder whereby the volume of air of the compensating chamber is greater than that of the measuring cylinder, a photo head for said outlet conduit including two oppositely disposed tubular arms, a photo cell in one arm, a light source in the other arm, means mounting said arms at a sharp angle symmetrically with respect to the mid-axis of the measuring cylinder and the direction of flow of the fuel to be measured, electrical circuits for said light source and said magnetically controlled valve means, a stop watch provided with an operating key and an electrical circuit for said photo cell leading to said stop watch for controlling current to said circuits for said light source and magnetically controlled valve means whereby actuation of the operating key completes the circuits to the light source, the photo cell thereby starting the stop watch and the magnetically controlled valve thereby closing said valve means for arresting fuel flow to said measuring cylinder and when the fuel level in the outlet conduit reaches a focused ray from the light source, the ray is reflected upon the photo cell thereby breaking the circuits to the light source and the valve means thus opening the valve means for permitting fuel in the compensating chamber to again fill the measuring cylinder and stopping the stop watch.

2. In an assemblage for automatically determining the fuel consumption of internal combustion engines, heating plants and the like, a compensating chamber for the fuel to be measured, said compensating chamber including a transparent cylinder, a lid, a base and an outlet in the base, magnetically controlled valve means for said outlet, said magnetically controlled valve means comprising two poles supported by the lid and projecting into said transparent cylinder, a hollow stem, an armature supporting said stem cooperable with said poles, a valve head on the stem, and a valve seat in the base of the transparent cylinder associated with the outlet and with which the valve head coacts, a measuring cylinder below and in communication with said outlet, an outlet conduit for said measuring cylinder, a photo head for said outlet conduit including two oppositely disposed arms arranged at an acute angle to the horizontal, a photo cell in one arm, a light source in the other arm, a collecting lens in said other arm for projecting a ray at the axis of the outlet conduit, means mounting said arms at an angle with respect to said outlet conduit determined by the angle of reflection of a focused ray from the light source on the surface of the fuel in the outlet conduit, electrical circuits for said light source and said magnetically controlled valve means, a stop watch provided with an operating key and an electrical circuit for said photo cell leading to said stop watch for controlling current to said circuits for said light source and magnetically controlled valve means whereby actuation of the operating key completes the circuits to the light source, the photo cell thereby starting the stop watch and the magnetically controlled valve means thereby closing said valve means for arresting fuel flow to said measuring cylinder and when the fuel level in the outlet conduit reaches the focused ray from the light source, the ray is reflected upon the photo cell thereby breaking the circuits to the light source and the valve means thus opening the valve means for permitting fuel in the transparent cylinder to again fill the measuring cylinder and stopping the stop watch.

3. The assemblage as claimed in claim 2, in which said lid is provided with an adjustable air venting valve for permitting the fuel level in the transparent cylinder to be adjusted and said base is provided with a fuel inlet.

4. The assemblage as claimed in claim 3, in which said hollow stem provides a communication path between the space in the transparent cylinder and the upper space in the measuring cylinder.

5. An assemblage for automatically determining the fuel consumption of internal combustion engines, heating plants and the like, comprising a compensating chamber for the fuel to be measured and having a volume of air therein, said chamber having an outlet, magnetically controlled valve means for opening and closing said outlet, a first photo head having two oppositely disposed tubular arms, a photo cell in one arm, a light source in the other arm, a measuring cylinder below said outlet, an outlet conduit for said measuring cylinder, said compensating chamber and measuring cylinder being located in a fuel line between a fuel source and point of utilization, said valve means including a hollow stem providing communication between the upper portion of the compensating chamber and the measuring cylinder whereby the volume of air of the compensating chamber is greater than that of the measuring cylinder, a second photo head having two oppositely disposed tubular arms, a photo cell in one arm, a light source in the other arm, means mounting said arms of said first and second photo heads at a sharp angle with respect to the mid-axis of the measuring cylinder and the direction of flow of the fuel to be measured, electrical circuits for said light sources and said magnetically controlled valve means, a stop watch provided with an operating key and electrical circuits for said photo cells leading to said stop watch for controlling current to said circuits for the light sources and magnetically controlled valve means whereby actuation of the operating key completes the circuits to the light sources and the magnetically controlled valve means thereby closing said valve means for arresting fuel flow from said outlet and when the fuel level in said first photo head reaches a focused ray from the light source, the ray is reflected upon the photo cell thereby starting the stop watch and when the fuel level reaches a focused ray from the light source in the second photo head, the ray is reflected upon the photo cell thereby breaking the circuits to the light sources and the valve means thus opening the valve means for permitting fuel in the compensating chamber to again pass through the outlet and stopping the stop watch.

6. The assemblage as claimed in claim 5, further including a run-out chamber connected to said outlet conduit below said second photo head and an outlet for said run-out chamber adapted to be connected to a fuel supply pipe.

References Cited by the Examiner

UNITED STATES PATENTS

| | | |
|---|---|---|
| 1,589,068 | 6/1926 | Givens. |
| 1,706,857 | 3/1929 | Mathe _____ 73—293 X |
| 2,490,627 | 12/1949 | Hofberg. |
| 2,505,905 | 5/1950 | McAfee _____ 73—223 |
| 3,000,207 | 9/1961 | Goffe _____ 73—113 |

FOREIGN PATENTS

| | | |
|---|---|---|
| 1,228,173 | 3/1960 | France. |
| 821,061 | 9/1959 | Great Britain. |

RICHARD C. QUEISSER, *Primary Examiner.*